Figure 1:
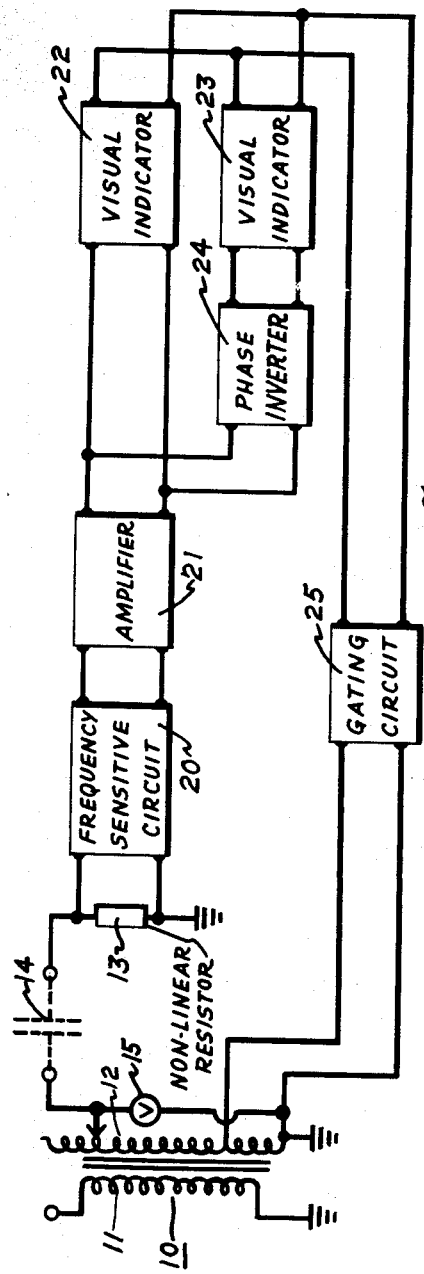

June 14, 1960 TSENG W. LIAO ET AL 2,941,143
VOLTAGE RESPONSIVE APPARATUS
Filed May 15, 1957 2 Sheets-Sheet 1

Inventors
Tseng W. Liao,
Alfred F. Boice,
by Gilbert P. Tarleton
Their Attorney.

Inventors,
Tseng W. Liao,
Alfred F. Boice,
by Gilbert P. Tarleton
Their Attorney.

United States Patent Office 2,941,143
Patented June 14, 1960

2,941,143

VOLTAGE RESPONSIVE APPARATUS

Tseng W. Liao, Pittsfield, Mass., and Alfred F. Boice, Shelbyville, Ind., assignors to General Electric Company, a corporation of New York Filed May 15, 1957, Ser. No. 659,279

6 Claims. (Cl. 324—54)

This invention relates to voltage responsive apparatus, and more in particular to an improved means for indicating the presence of recurring electrical transients such as corona discharge in electrical equipment. In the latter respect, it is particularly useful in the testing of the dielectric strength of electrical equipment, such as transformers, motors, generators and the like.

When a voltage applied across the dielectric material of an electrical device is gradually increased, a critical point is reached wherein partial breakdown of the dielectric material occurs as a result of free electrons within the dielectric material reaching such an energy level that they free additional electrons and thus effect an avalanche of electrons. This critical point is commonly referred to as the corona onset or corona starting voltage and is a measure of the dielectric strength of the insulation employed in the electrical device. Mathematical calculation of the corona onset voltage is impractical in electrical equipment as a result of the usual non-uniform electric fields present and the inhomogeneity of insulation employed.

The corona occurs only momentarily during one or both half cycles of the voltage applied across the dielectric material since it is rapidly neutralized by the building up of a space charge in the material. The corona results in voltage pulses or damped high frequency oscillations superposed upon the applied voltage, and these pulses or oscillations are therefore an indication of the presence of corona.

In the past, equipment has been provided for determining the corona onset voltage of electrical apparatus. Such equipment generally comprises means for applying a variable voltage of known magnitude to the apparatus, and visual means such as an oscilloscope for indicating the presence of pulses or oscillations at the terminals of the apparatus. While such apparatus has provided satisfactory indication of corona, it has generally been expensive and complicated and technical skill has been required to interpret the information provided by the apparatus.

It is therefore an object of this invention to provide economical voltage responsive means for indicating the presence of recurring electrical transients such as pulses or oscillations.

Another object is to provide voltage responsive means for indicating the presence of recurring electrical transients such as pulses or damped oscillations and having a "go-no-go" type of indication to enable the use of the voltage responsive means by an unskilled operator.

A still further object of this invention is to provide simplified means for detecting the presence of corona in an electrical device, the means being characterized by providing a "go-no-go" indication readily understandable by an unskilled operator.

Briefly stated, in accordance with one aspect of our invention, we provide a voltage responsive apparatus comprising means for applying a variable alternating voltage of determinable magnitude to the terminals of an electrical device. For example, the electrical device may be a transformer which is being tested to determine the corona onset voltage. Frequency sensitive means is also connected to the terminals of the electrical device, and the frequency sensitive means provides an output voltage substantially free of components of the frequency of the alternating voltage applied to the terminals. A pair of indicating means are connected to the output of the frequency sensitive means and gating means are provided for alternately rendering the indicating means inoperative during opposite half cycles of the alternating voltage. Amplifying means may also be provided between the frequency sensitive means and the indicating means in order that the apparatus be more sensitive.

While the specification concludes with claims particularly pointing out and distinctly claiming the subject matter which we regard as our invention, it is believed that the invention will be better understood from the following description taken in connection with the accompanying drawing.

Figure 2:
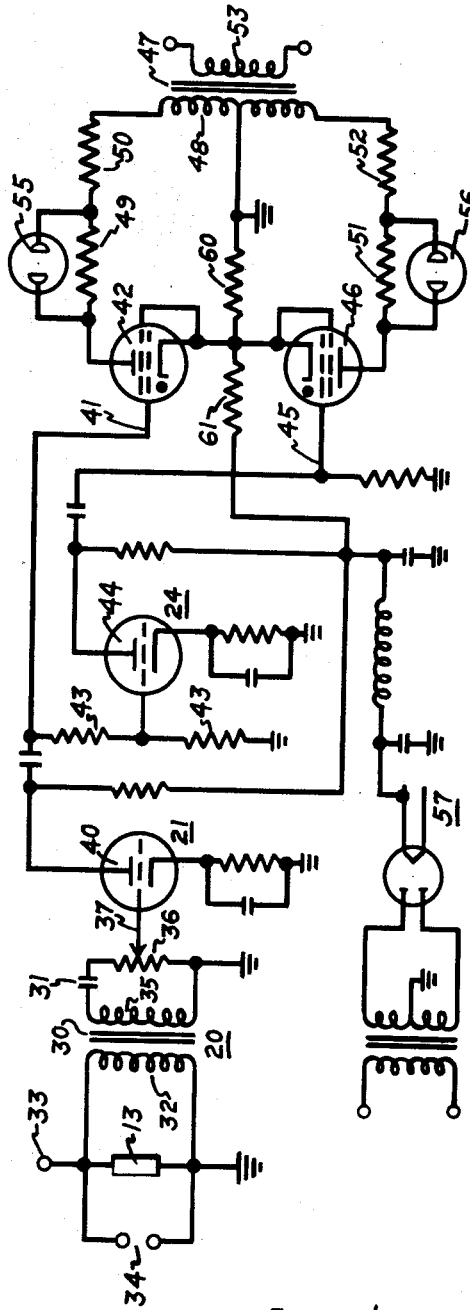
Figure 3:
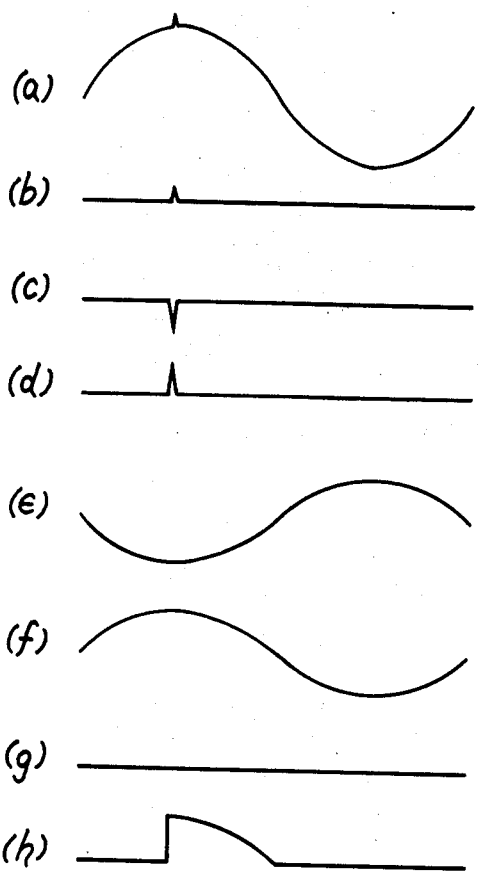
Figure 4:
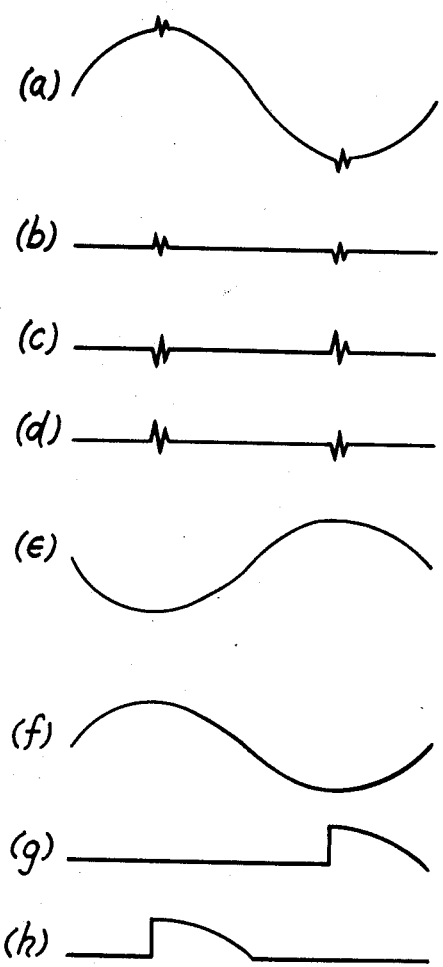

In the drawing:

Fig. 1 is a block diagram of the circuit of a voltage responsive apparatus according to our invention, Fig. 2 is a circuit diagram of a frequency sensitive circuit, amplifier, indicating and gating means that may be employed in the arrangement of Fig. 1, Fig. 3 is a sequence chart illustrating the response of the circuit of Fig. 2 to a pulse occuring on only one-half cycle of the voltage applied to an electrical device being tested, and Fig. 4 is a sequence chart illustrating the response of the circuit of Fig. 2 to damped oscillations occurring in both half cycles of the voltage applied to an electrical device being tested.

Referring now to the drawing, and more in particular to Fig. 1, therein is illustrated a transformer 10 having a primary winding 11 and a secondary winding 12. The primary winding 11 is adapted to be connected to a source of alternating voltage of predetermined frequency, and the secondary winding 12 is connected in series with a resistor 13 and an electrical device 14 which is to be tested. The electrical device 14 is herein represented as a capacitance since in the testing of an electrical device for the corona onset voltage, a high voltage is impressed across the insulation of the device and the device acts in effect as a capacitor. Thus, the electrical device 14 may be any electrical equipment having a dielectric material disposed between conductive parts adapted to operate at different potentials. The secondary winding 12 of the transformer 10 may be tapped in order to provide a variable voltage across the electrical device 14, although it is obvious that the transformer 10 may alternatively be a non-variable step-up transformer supplied by a variable low voltage source. Means such as a voltmeter 15 connected across the active portion of the secondary winding 12 may be provided in order to indicate the voltage applied to the terminals of the electrical device 14.

A frequency sensitive circuit 20 is connected across the resistor 13, and the output of the frequency sensitive circuit 14 may be connected to an amplifier 21. The resistor 13 preferably has non-linear resistance in order to reduce the danger of excess voltage at the terminals of the frequency sensitive circuit. A pair of visual indicators 22 and 23 are connected to the output of the amplifier 21, with visual indicator 22 being connected directly to the output of the amplifier and visual indicator 23 being connected to the output of the amplifier 21 by way of a phase inverting circuit 24. A gating circuit 25 is provided having its input connected to a low voltage tap on the secondary winding 12, and having its output connected to the visual indicators 22 and 23.

Referring now to Fig. 2, the frequency sensitive circuit 20 is comprised of a pulse transformer 30 and capacitor 31. The primary winding 32 of the pulse transformer 30 is connected in parallel with the resistor 13, the resistor 13 being adapted to be connected in series with the electrical device 14 across the secondary winding of the transformer 10 of Fig. 1. A terminal 33, adapted to be connected to the terminal of the electrical device to be tested may be provided connected to one end of the resistor 13. A protective gap 34 may also be provided in parallel with resistor 13. The secondary winding 35 of the pulse transformer 30 is serially connected with the capacitor 31 and a potentiometer 36. The pulse transformer 30 and capacitor 31 are frequency sensitive in the respect that they attenuate low frequency voltages and provide an output on the arm 37 of the potentiometer 36 that is substantially free of power circuit frequencies. It will be obvious, of course, that other frequency sensitive means such as are well known in the art may alternatively be provided without departing from the spirit or scope of the invention.

The arm 37 of the potentiometer is connected to the control grid of an amplifying tube 40, the amplifier tube 40 and associated circuit comprising the amplifier 21, and the output of the tube 40 is connected to the control grid 41 of a gas tetrode 42. It will of course be obvious that a more elaborate amplifier may be employed to provide greater sensitivity for the circuit. The output amplifier 21 is also connected to a phase inverter 24 by way of a resistance voltage divider 43, the phase inverter comprising a triode 44, and the output of the phase inverter is connected to the control grid 45 of gas tetrode 46.

Plate supply voltage for the gas tetrodes 42 and 46 is provided by a transformer 47 having a center tapped secondary winding 48, the plate of gas tetrode 42 being connected to one end of the secondary winding 48 by way of resistors 49 and 50, and the plate of gas tetrode 46 being connected to the other end of the secondary winding 48 by way of resistors 51 and 52. The primary winding 53 of the transformer 47 is adapted to be connected to an alternating voltage supply synchronized with the voltage applied to the terminals of the electrical device being tested. Thus, the primary winding 53 may be connected to a low voltage tap on the transformer 10 of Fig. 1.

Visual indicating means, such as neon lamps 55 and 56 are connected in parallel respectively with the resistors 49 and 51. It will be obvious, of course, that other indicating means may alternatively be employed and arranged to be energized by the plate current flow of the gas tetrodes.

A power supply 57 of any conventional type may be employed to provide plate voltage for the amplifier 21 and phase inverter 24 and bias supply for the gas tetrodes 42 and 46.

In testing an electrical device such as the device 14 of Fig. 1, the alternating voltage applied to the terminals of the device by the transformer 10 is gradually increased. The frequency of the applied voltage is preferably low, such as, for example, the power frequency 60 cycles per second. When the applied voltage reaches the corona onset voltage of the device 14, a voltage pulse or damped oscillation appears across the terminals of the device, and this pulse or oscillation is superimposed on the low frequency voltage appearing across the non-linear resistor 13 in series with the electrical device 14.

If, for example, the corona occurs only as a pulse on the positive half cycles of applied voltage, the voltage waveform developed across the resistor 13 may appear as in Fig. 3(a), which illustrates a pulse superimposed on the positive peak of a single cycle of the applied voltage. The frequency sensitive circuit 20 attenuates the low frequency component of the waveform of Fig. 3(a), and the voltage input to the amplifier has a waveform comprising a single pulse with substantially no low frequency component, Fig. 3(b). The amplified output of the amplifier, comprising also an amplified single pulse recurring during each full cycle of the low frequency voltage, Fig. 3(c) appears at the control grid of gas tetrode 42. The output of the amplifier is inverted by phase inverter 24, and the inverted output voltage waveform, Fig. 3(d), appears at the control grid of gas tetrode 46. The primary winding 53 of the transformer is connected to the source of applied voltage (e.g. to a low voltage tap on the transformer 10 of Fig. 1), so that the alternating voltage applied to the plate of the gas tetrode 42 Fig. 3(e), is 180° out of phase with the applied voltage and the alternating voltage of gas tetrode 46, Fig. 3(f) is in phase with the applied voltage.

The fixed cathode bias of the gas tetrodes (provided by a resistance voltage divider comprised of resistors 60 and 61) is sufficient to hold the tubes non-conducting until triggered by a positive pulse or oscillation is applied to their control grid.

In the preceding example, no plate current will flow in gas tetrode 42, Fig. 3(g), since the plate voltage is negative during the positive half cycle of applied voltage, while gas tetrode 46 will be triggered to provide a plate current, Fig. 3(h), during this half cycle. Neither tube conducts during the second half of applied voltage. The resultant plate current of gas tetrode 46 develops a voltage across resistor 51 and neon tube 56, causing the neon tube 56 to glow.

If the corona occurs on both half cycles of the applied voltage, for example as damped oscillations, the voltage appearing across the resistor 13 will be the low frequency applied voltage having damped oscillations on both positive negative peaks Fig. 4(a). In this event the output of the frequency sensitive circuit 20, Fig. 4(b), as amplified, Fig. 4(c) is comprised of two signals during a single cycle of the low frequency applied voltage, the low frequency component being attenuated to be substantially eliminated. This signal, Fig. 4(c), is applied to the grid of tube 42, while the inverter signal, Fig. 4(d), is applied to the control grid of tube 46. The plate voltage of tube 42, Fig. 4(e), and tube 46, Fig. 4(f), is the same as in the preceding example, and thus tube 46 will be triggered to provide a plate current, Fig. 4(h), during the positive half cycle of applied voltage, and tube 42 will be triggered to provide a plate current, Fig. 4(g), during the negative half cycle of applied voltage. As a result of the plate currents flowing in both gas tetrodes, visual indication will be provided by both neon tubes.

From the preceding example, it is seen that visual indication is provided by neon tube 56 if corona occurs only on positive half cycles of applied voltage, and by both the neon tubes 55 and 56 if the corona occurs during both half cycles of applied voltage. It will be obvious that corona occurring only during negative half cycles of applied voltage results in visual indication only by neon tube 55.

The sensivity of the circuit of Fig. 2 may be changed by various means, such as by adjusting the potentiometer 37, so that the visual indication of the neon tubes occurs only when input signals, such as corona pulses, are larger than a predetermined voltage. The simple indication provided enables an unskilled operator to use the apparatus to test the dielectric strength of electrical devices, since it is only necessary to gradually increase the voltage applied to the terminals of the electrical device, note the voltage applied to the terminals when the neon tubes first begin to glow, and if desired, to note which tube glows if they are not both energized.

It will be understood, of course, that, while the form of the invention herein shown and described constitutes the preferred embodiment of the invention, it is not intended herein to illustrate all of the possible equivalent forms or ramifications thereof. It will also be understood that the words employed are words of description rather than of limitation and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. Voltage responsive apparatus for indicating the presence of random recurring electrical transients superimposed upon an alternating voltage comprising frequency sensitive means for attenuating voltages of the frequency of said alternating voltage, first and second indicating means connected directly and inversely respectively to the output of said frequency sensitive means, and gating means synchronized with said alternating voltage to alternately render said indicating means inoperative during opposite half cycles of said alternating voltages.

2. Voltage responsive apparatus for indicating the presence of random recurring electrical transient voltages superimposed upon an alternating voltage comprising frequency sensitive means for attenuating voltages of the frequency of said alternating voltage, first and second indicating means connected directly and inversely respectively to the output of said frequency sensitive means and arranged to give a visual indication of said random transient voltages when they have a predetermined minimum amplitude, and gating means connected to said indicating means, said gating means being synchronized with said alternating voltage to prevent indication by said first indicating means during positive half cycles of said alternating voltage and to prevent indication by said second indicating means during negative half cycles of said alternating voltage.

3. Corona responsive apparatus comprising means for applying a variable alternating voltage of determinable magnitude to the terminals of an electrical device, frequency sensitive means connected to said terminals providing an output from which voltages of the frequency of said alternating voltage have been substantially eliminated, first and second indicating means connected directly and inversely respectively to the output of said frequency sensitive means, and gating means alternately rendering said indicating means inoperative during opposite half cycles of said alternating voltage.

4. Corona responsive apparatus comprising means for applying a variable alternating voltage of determinable magnitude to the terminals of an electrical device, frequency sensitive means connected to the terminals of said electrical device, said frequency sensitive means providing an output signal substantially free of frequency components of said alternating voltage, first and second indicating means energized directly and inversely respectively by said output signal to indicate the presence of electrical transients of a predetermined minimum amplitude at the terminals of said electrical device, and gating means synchronized with said alternating voltage and connected to alternately prevent indication by said indicating means during opposite half cycles of said alternating voltage.

5. Apparatus for determining the corona onset voltage of an electrical device comprising means for applying a variable alternating voltage of determinable magnitude to terminals of said electrical device, frequency sensitive means connected to said terminals for providing an output signal substantially free of frequency components of said alternating voltage, a pair of gas tubes having alternating plate supply voltage of opposite polarity synchronized with said alternating voltage, means applying said output signal directly to trigger one of said gas tubes and inversely to trigger the other of said gas tubes, and separate indicating means energized by plate current flow of said gas tubes.

6. The apparatus of claim 5 wherein the indicating means comprise neon tubes connected in parallel with series resistors in the plate circuits of said gas tubes.

References Cited in the file of this patent

UNITED STATES PATENTS

| 2,617,858 | Brink | Nov. 11, 1952 |
| 2,691,158 | Wittenberg | Oct. 5, 1954 |
| 2,703,380 | Frazer | Mar. 1, 1955 |
| 2,802,180 | Nye | Aug. 6, 1957 |
| 2,822,518 | Jordan | Feb. 4, 1958 |